US008097820B2

United States Patent
Klubertanz

(10) Patent No.: US 8,097,820 B2
(45) Date of Patent: Jan. 17, 2012

(54) CONTROLLING A SCALE IN CONNECTION WITH A CONTAINER OF POURABLE BULK MATERIALS

(75) Inventor: Kevin Klubertanz, Fort Atkinson, WI (US)

(73) Assignee: Digi-Star, LLC, Fort Atkinson, WI (US)

( * ) Notice: Subject to any disclaimer, the term of this patent is extended or adjusted under 35 U.S.C. 154(b) by 367 days.

(21) Appl. No.: 12/366,204

(22) Filed: Feb. 5, 2009

(65) Prior Publication Data
US 2010/0193256 A1   Aug. 5, 2010

(51) Int. Cl.
  G01G 13/00 (2006.01)
  G01G 19/00 (2006.01)
(52) U.S. Cl. ........ 177/25.13; 177/116; 222/77; 702/174
(58) Field of Classification Search .......... 702/101, 702/174, 175; 222/55, 56, 77, 185.1; 141/83; 177/25.13, 116–122
  See application file for complete search history.

(56) References Cited

U.S. PATENT DOCUMENTS

| | | | | |
|---|---|---|---|---|
| 4,236,240 A * | 11/1980 | Yoshida | | 368/76 |
| 4,345,628 A * | 8/1982 | Campbell et al. | | 141/83 |
| 4,522,275 A * | 6/1985 | Anderson | | 177/25.13 |
| 4,911,256 A * | 3/1990 | Attikiouzel | | 177/25.16 |
| 5,016,197 A * | 5/1991 | Neumann et al. | | 702/188 |
| 5,285,020 A * | 2/1994 | Jurca | | 177/139 |
| 5,764,522 A * | 6/1998 | Shalev | | 700/240 |
| 6,384,349 B1 * | 5/2002 | Voll | | 177/25.19 |
| 7,104,425 B2 * | 9/2006 | Le Roy | | 222/185.1 |
| 7,507,917 B2 * | 3/2009 | Kaltenheuser | | 177/136 |
| 7,629,542 B1 * | 12/2009 | Harding et al. | | 177/148 |
| 7,633,021 B2 * | 12/2009 | Pfohl et al. | | 177/141 |
| 7,735,365 B2 * | 6/2010 | Crain et al. | | 73/296 |
| 7,858,888 B2 * | 12/2010 | Lucas et al. | | 177/136 |
| 2001/0038018 A1 * | 11/2001 | Bell et al. | | 222/58 |
| 2008/0127711 A1 * | 6/2008 | Farag | | 73/1.11 |
| 2009/0205877 A1 * | 8/2009 | Claypool | | 177/239 |

OTHER PUBLICATIONS

Digi-Star EZ 400 Operators Manual, Mar. 4, 2008.

* cited by examiner

*Primary Examiner* — Randy W Gibson
(74) *Attorney, Agent, or Firm* — Andrew C. Landsman; Nicholas A. Kees; Godfrey & Kahn, S.C.

(57) ABSTRACT

A method of controlling a scale in connection with to a carrier of pourable bulk materials. The scale involved has a control with a display and control buttons. Upon a first press of a first control button, the system is transitioned into a "tare" mode and displays a base, or tare, value. Upon a second press of the first control button, generally after unloading some or all of the load, the difference in weight from the first press is saved to a storage medium, and a value displayed representing the weight of bulk material in the container at that time. The method may also include the pressing of a Zero button to zero the scale before the carrier is first loaded.

12 Claims, 6 Drawing Sheets

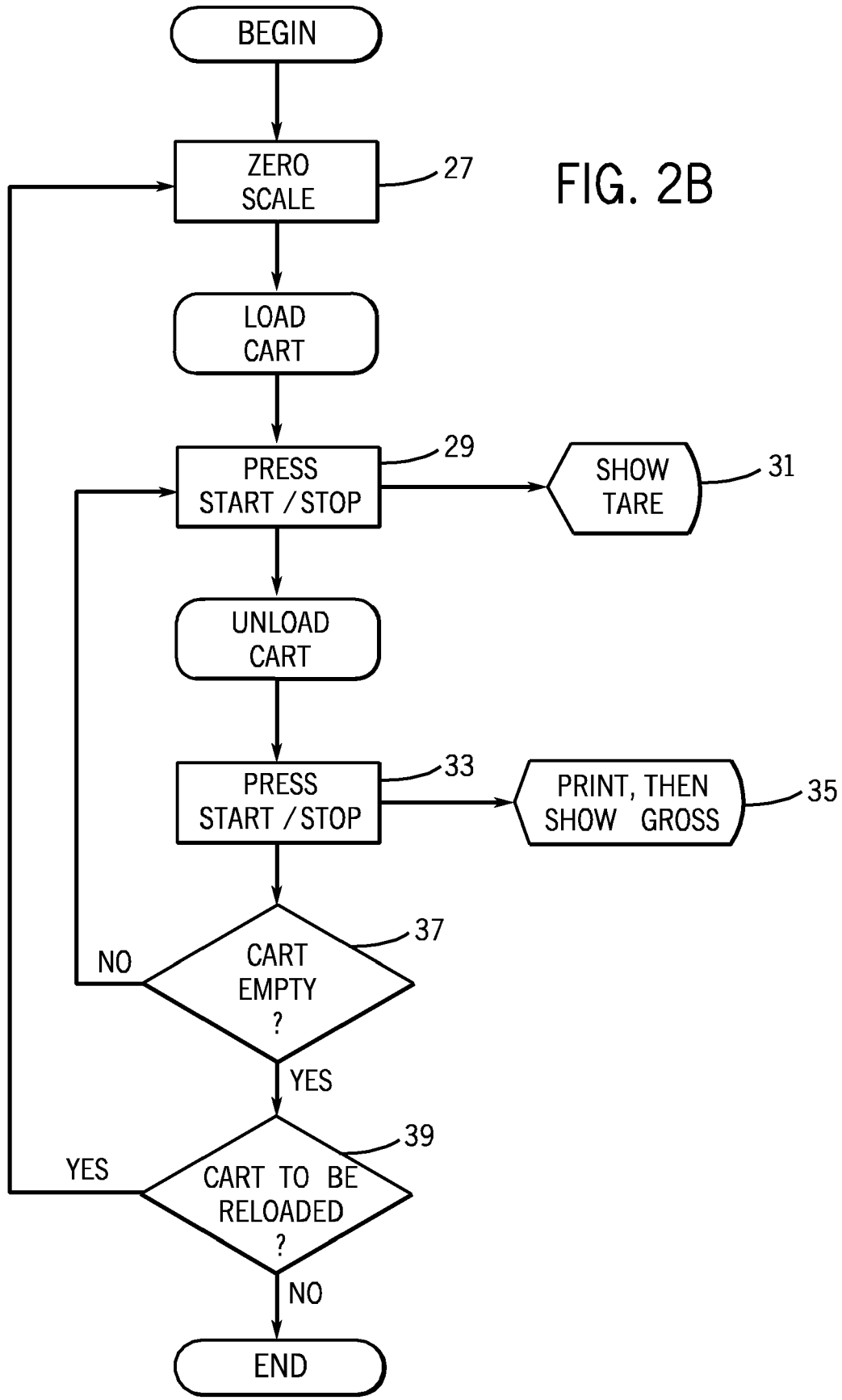

CONTROLLING A SCALE IN CONNECTION WITH A CONTAINER OF POURABLE BULK MATERIALS

BACKGROUND OF THE INVENTION

The present invention relates to scale controls, and in particular to scale controls for use in connection with containers or carriers of pourable materials, such as grains, gravels and other particulate materials, and liquids.

In certain applications involving the carrying of pourable materials, such as the harvesting of grain, it is important to know the weight of the materials being carried, and it is also important to know the amount of materials that have been loaded onto the carrier, and the amount of materials that have been off-loaded from the carrier. In order to properly accomplish these functions, certain conventional scale controls have a number of control buttons that must be pushed, in a certain order and at predetermined times, in order to ensure the proper operation of the scale and the carrier to which the scale is applied.

As one specific example, the Digi-Star EZ2400 scale control system requires the operator to press the Zero button before the material is loaded onto the carrier. Once the material is loaded and the display shows the current weight of material in the carrier, the operator must then press the Tare button, to get the display to go to zero. The next step is to unload, at least partially, the carrier. In doing so, the display will show the amount of weight off-loaded, as a negative number. When the desired weight is unloaded, the Print button is pressed, to save to a storage medium the amount that was off-loaded. Thereafter, the Gross/Net button is pressed, and the display shows the weight of the materials remaining in the carrier.

This procedure is complicated, and is not easily conveyed to an untrained or casual or part-time operator, and so a need exists for a simpler and more understandable scale control system.

The present invention relates to improvements to the systems described above, and to solutions to the problems raised or not solved thereby.

SUMMARY OF THE INVENTION

The invention provides a method of controlling a scale in connection with or connected to a container or carrier of pourable bulk materials, and of operating the container or carrier. The scale involved has a control with a display and control buttons. According to the invention, assuming that the carrier is loaded and ready to be unloaded, upon a first press of a first control button, the system is transitioned into a "TARE" mode and displays a net or base value, most often Zero. Upon a second press of the first control button, assumedly after unloading at least part of the load, any difference in weight from the first press is saved to a storage medium, and then automatically a value is displayed representing the weight of bulk material in the container at that time.

An optional feature would be the ability to reset to zero the weight stored in the scale control, in response to the press of a second control button. Another option would be to turn off the power to the scale control, in response to the press of a third control button. The ability to display the data in a field, other than the weight, in response to the press of a fourth control button, would be another option.

Other objects and advantages of the invention will become apparent hereinafter.

BRIEF DESCRIPTION OF THE DRAWING FIGURES

FIG. 2B is a schematic diagram showing the flow of the process according to the invention, showing additional, optional, steps.

DESCRIPTION OF THE PREFERRED EMBODIMENTS

Figure 1:
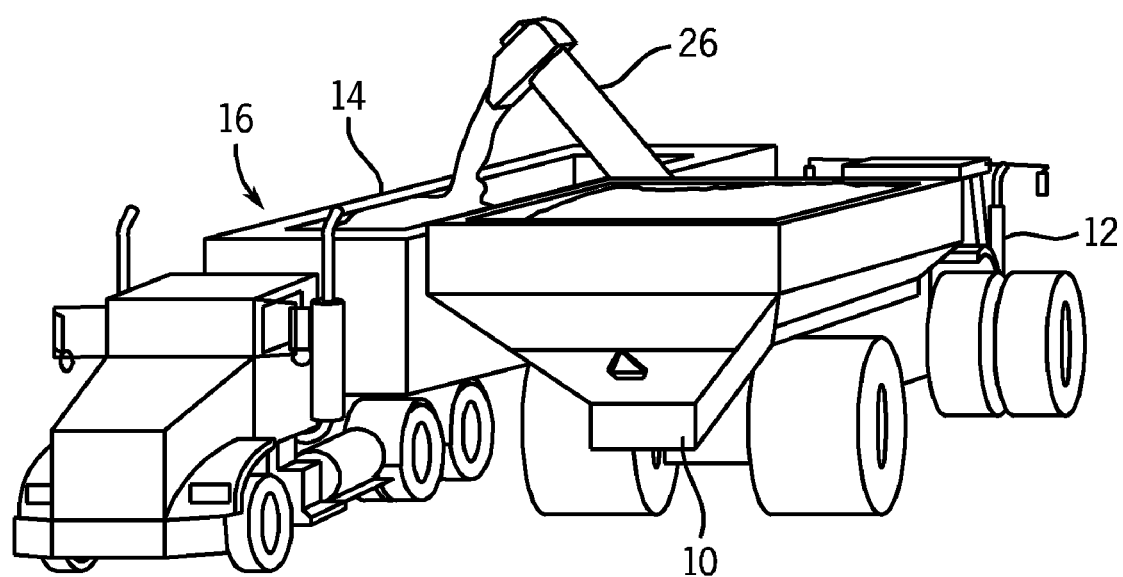
FIG. 1 is a perspective view of a loaded grain cart, drawn by a tractor, and unloading onto a semi trailer.

While the invention may be susceptible to embodiment in different forms, there is shown in the drawings, and herein will be described in detail, certain illustrative embodiments with the understanding that the present disclosure is to be considered an exemplification of the principles of the invention, and is not intended to limit the invention to those embodiments illustrated and described herein. Additionally, features illustrated and described with respect to one embodiment could be used in connection with other embodiments.

FIG. 1 shows a typical use of a grain cart 10, that is, loaded with grain or other pourable materials, such as gravels and other particulate materials, and including liquids. The grain cart 10 is shown being drawn and powered by a tractor 12, and unloading its load of grain into the trailer 14 of a semi 16. According to the invention, the grain cart 10 includes an integrated scale, with a scale display 20, shown in FIGS. 3-8. The invention relates to the method of controlling the scale so as to simplify its operation, even for relatively untrained individuals.

Figure 2A:
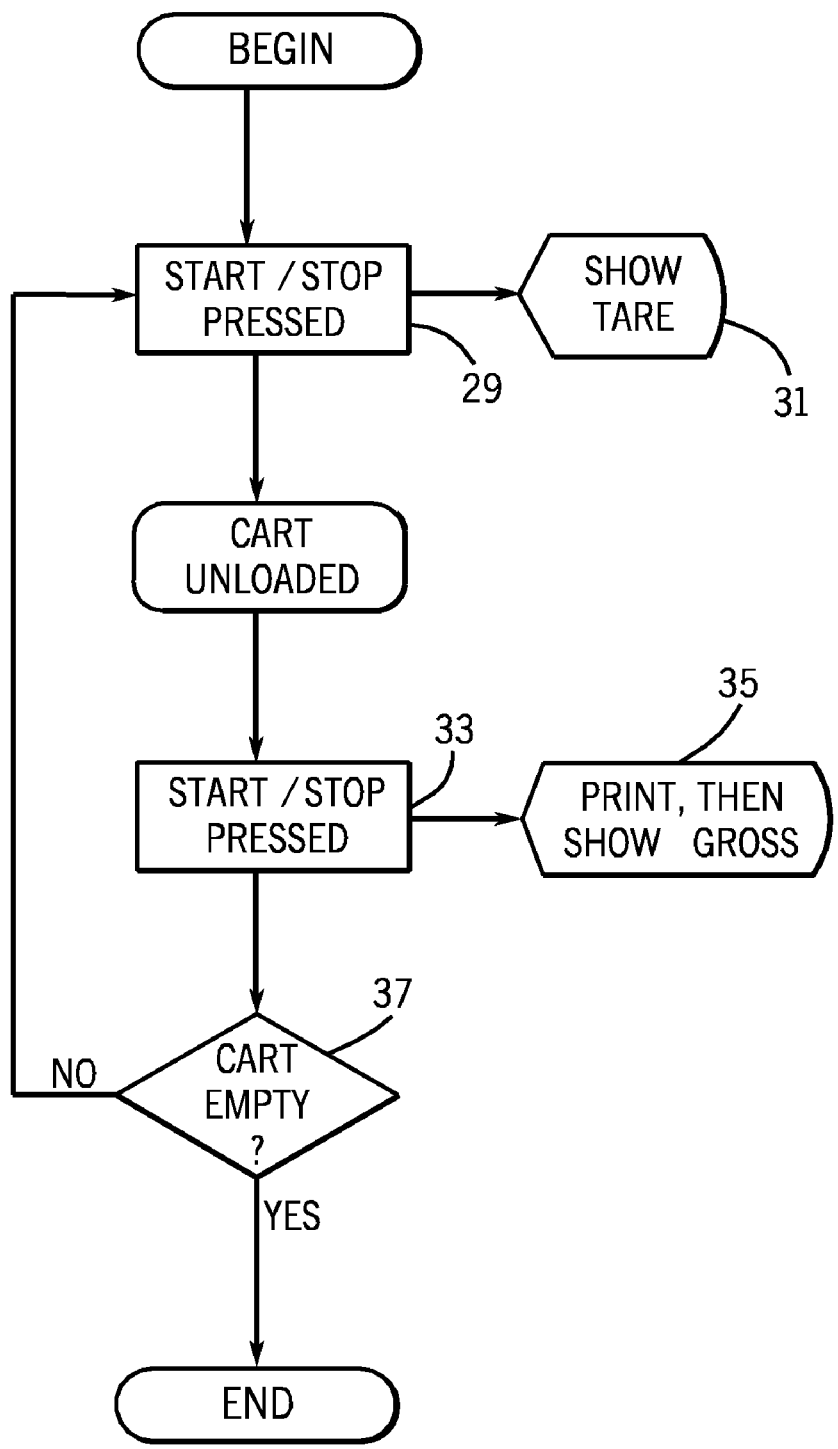
FIG. 2A is a schematic diagram showing the flow of the process according to the invention.
Figure 3:
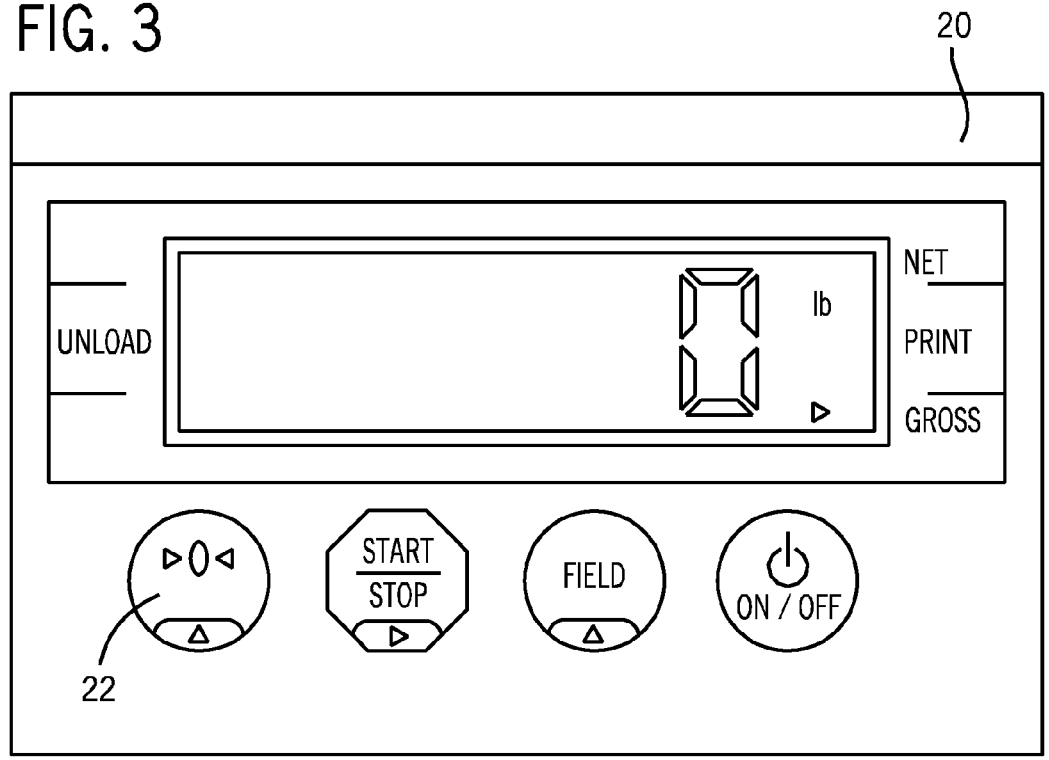
FIGS. 3-8 are screen shots of a display showing the information displayed at the various steps of the process according to the invention.
Figure 4:
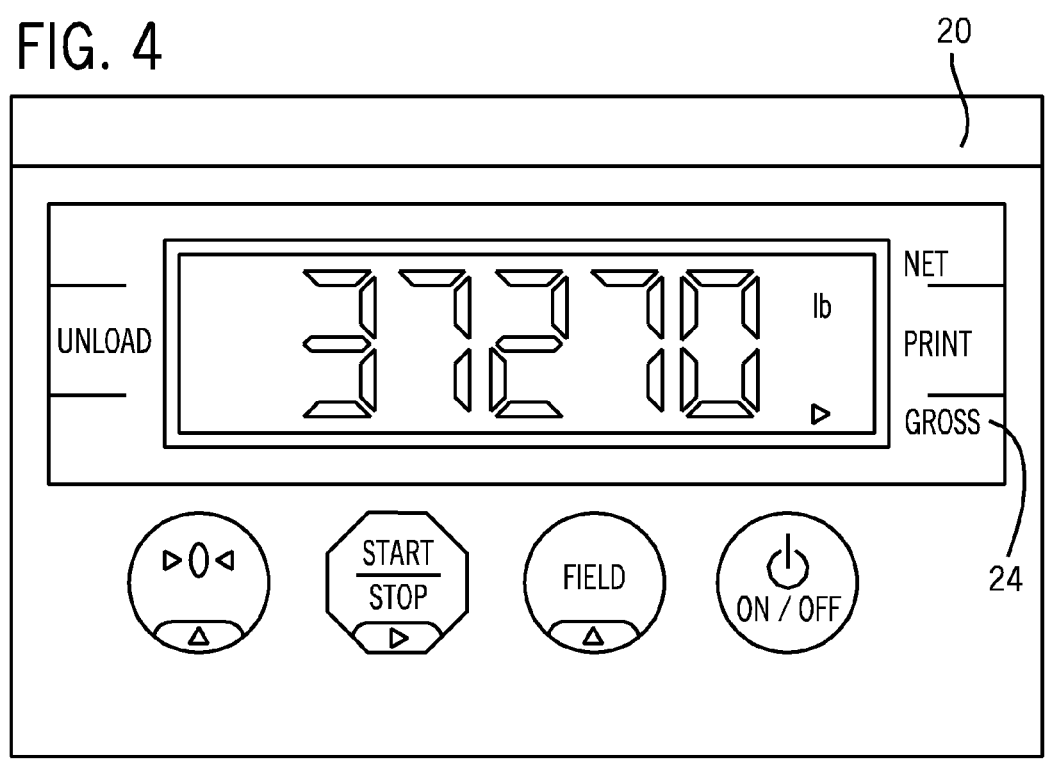
Figure 5:
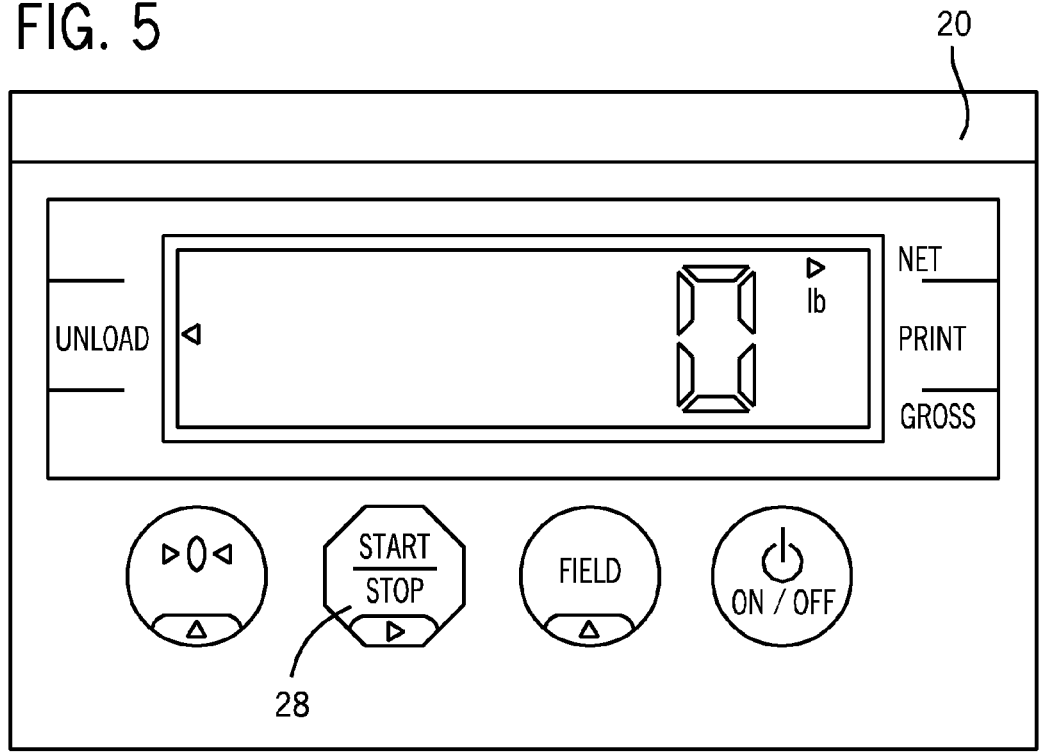
Figure 6:
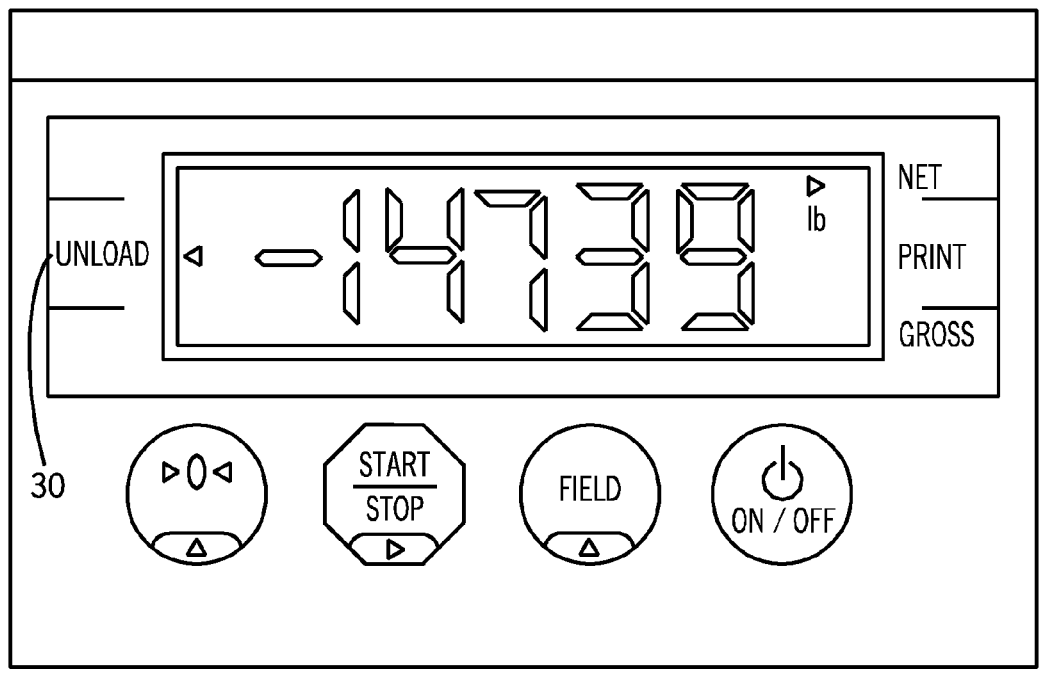

The fundamental aspects of the process are shown diagrammatically in FIG. 2A, and the various displays shown to the operator are shown in FIGS. 4-8. The loaded cart 10 is taken to the place where unloading is to be done. In the example where the pourable material is grain, the loading could be done from a harvester such as a combine, and the unloading could be done to a semi 16, as shown in FIG. 1. As another example, the loading could be done from a feed storage station or grain elevator, and the unloading could be done at feed bunks for cattle at various remote cattle feed lots. In any event, when the place where the unloading is to be done is arrived at, the auger 26 (for particulate materials, or a pump outlet, for liquid materials) is extended over the semi 16, the feed bunk or other receptacle. At that point, the operator will see the display of a scale control substantially as shown in FIG. 4, showing the gross weight currently in the cart 10. In the embodiment shown, a pointer or indicator 24 for GROSS weight is highlighted. The operator then presses a first control button on the scale control, the START/STOP button 28 in the embodiment shown in FIG. 5, for example. Upon the first press 29 of this control button, as shown in FIG. 2A, the scale display will transition into a SHOW TARE mode 31, that is, the current weight will be shown as Zero, as shown in FIG. 5, for the purpose of clearly displaying the change in weight as the material is being unloaded. In the embodiment shown, a pointer or indicator 30 for NET weight is highlighted to indicate that the number displayed is a net figure from the TARE mode. At this point, the unloading is begun, and the scale display will show an escalating negative number, as shown in FIG. 6, to indicate the amount of pourable material unloaded from the cart 10. Optionally, the display may also highlight a pointer 30 for UNLOAD, and may also occasionally flash UNLOAD in the main display window as pourable material continues to be unloaded.

Figure 7:
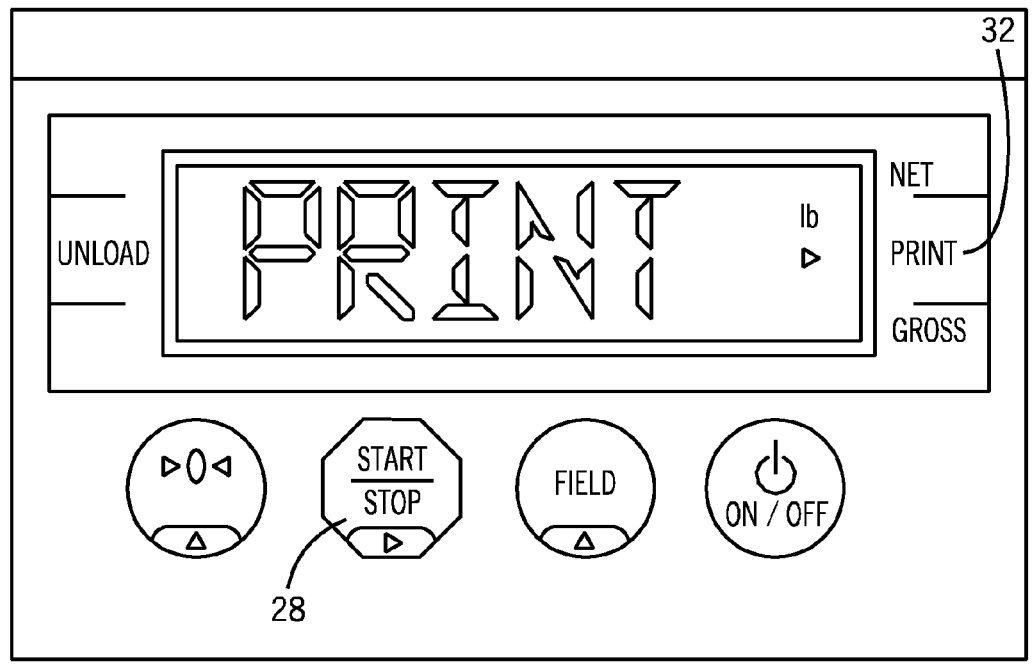
Figure 8:
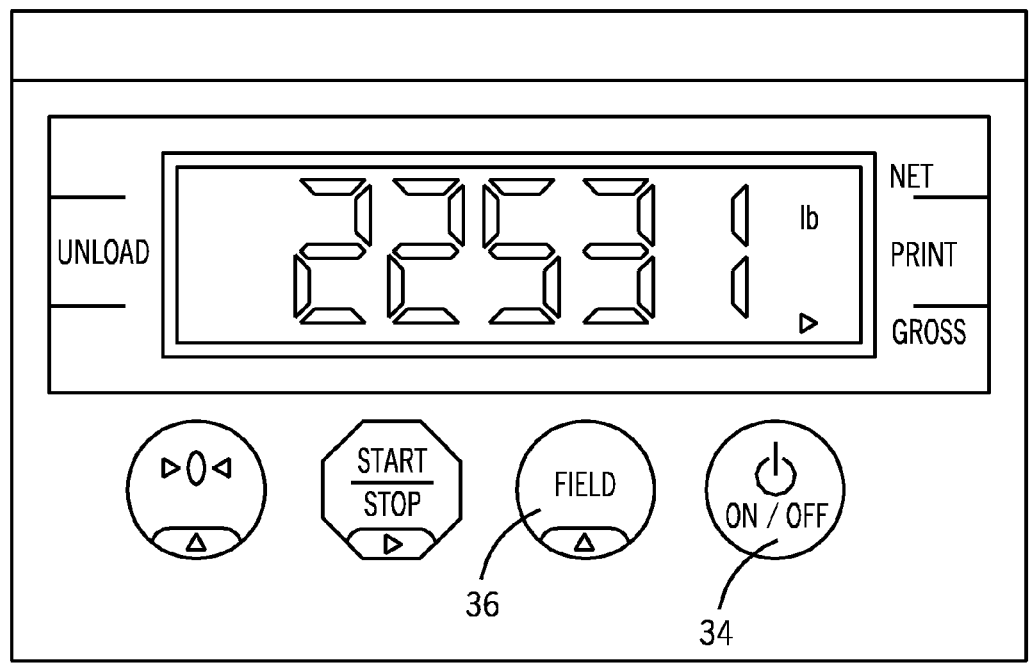

Once the unloading to the desired level is finished at that semi, feed bunk or other location, which is normally when the display indicates that a predetermined weight of material has been unloaded, the operator presses the same first control button, the START/STOP button in the embodiment shown, a second time. Upon this second press 33 (FIG. 2A) of the first control button, a PRINT THEN SHOW GROSS function 35 is activated. In this function, data regarding the weight unloaded, and possibly other parameters including time, date and other user-defined data fields, are saved (or "printed") to a data storage unit, and/or sent to a remote location for later storage, printout and/or analysis. The word PRINT may be shown in the main display, as shown in FIG. 7, and a pointer 32 for PRINT may be highlighted. Once that PRINT function is accomplished, the display shifts automatically, without any further operator interaction, back into a GROSS weight mode, and displays the total weight of materials currently remaining in the cart 10, as shown in FIG. 8.

If the cart 10 is substantially empty at that point 37 (FIG. 2A), the process can be considered finished. If, however, further unloading must be done, for example when only a partial load from the cart 10 is placed in one feed bunk, with the remainder of the load going to other feed bunks, the operation is restarted at the point where the START/STOP button is pressed the first time 29, to bring about the TARE function once again.

Further functions are shown in the flow diagram in FIG. 2B. As shown there, the overall process is initiated, even before the cart 10 is loaded the first time, by zeroing 27B the scale. This is done by pressing the Zero key 22 on the display 20, FIG. 3, so as to reset the scale to zero, before any pourable materials are loaded into the cart 10. In the preferred embodiment, the Zero key is required to be pressed for an extended period of time, most preferably about three seconds, so as to reduce the likelihood that the scaled is inadvertently reset to zero. The pourable materials are then loaded onto the cart 10, whereupon the scale display will show the weight of the materials loaded, as shown in FIG. 4, as described above, with the pointer 24 for GROSS weight highlighted. The process then proceeds as described above, with the operator then pressing the first control button on the scale control (the START/STOP button 28 in the embodiment shown in FIG. 5), and upon the first press 29 of this control button, the scale display will enter the SHOW TARE mode 31. At this point, the unloading is begun. Once the unloading to the desired amount is finished, the operator presses the START/STOP button for the second time. Upon this second press 33 of the button, the PRINT THEN SHOW GROSS function 35 is activated, wherein the data is printed (saved), and the display shifts automatically back into a GROSS weight mode, displaying the total weight of materials remaining in the cart 10, as shown in FIG. 8. Continuing, if the cart 10 is not substantially empty at that point 37, and further unloading must be done, the operation is restarted at the point where the START/STOP button is pressed the first time 29, to bring about the SHOW TARE function once again. If the cart is substantially empty, though, then the decision 39 may be made to reload the cart 10. If that is the case, then the overall operation is begun again with the resetting 27 of the scale to zero.

A weighing system embodying the invention may also have numerous optional features, only a few of which will be set out at this point. For instance, the display may function without any ON/OFF button, or an ON/OFF 34 button may be included, so that one press of the ON/OFF button turns the display on, and a second press of the ON/OFF button turns the display off. As another optional feature, a FIELD button 36 may be supplied, so that a press of the FIELD button may display the data in a field other than the weight, which data is relevant to a particular delivery or unloading.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

I claim:

1. A method of controlling a scale in connection with a container of pourable bulk materials, the scale having a control with a display and control buttons, the method comprising the steps of:
   upon a first press of a first control button, transitioning into a "tare" mode and displaying a base value;
   upon a second press of the first control button, saving to a storage medium any difference in weight from the first press, and displaying a value representing the weight of bulk material in the container at that time.

2. A method as recited in claim 1 further comprising, resetting to zero the weight stored in the scale control, in response to the press of a second control button.

3. A method as recited in claim 2 further comprising, turning off the power to the scale control, in response to the press of a third control button.

4. A method as recited in claim 3 further comprising, displaying the data in a field, other than the weight, in response to the press of a fourth control button.

5. A method of operating a scale connected to a carrier of pourable bulk materials, comprising the steps of:
   pressing a first control button a first time, and thereby transitioning into a "net" mode and displaying a base value of weight of bulk materials in the carrier;
   pressing the first control button a second time, and thereby saving to a storage medium any difference in weight from the first press, and displaying a value representing the weight of bulk material in the container at the time the button is pressed the second time.

6. A method as recited in claim 5 further comprising, pressing a second control button, and thereby resetting to zero the weight stored in the scale control.

7. A method as recited in claim 6 further comprising, pressing a third control button, and thereby turning off the power to the scale control.

8. A method as recited in claim 7 further comprising, pressing a fourth button, and thereby displaying the data in a field, other than the weight, in response to the press of the fourth control button.

9. A method of operating a carrier of pourable bulk materials, the carrier including a scale with a control panel, a display and at least one control button, comprising:
   loading the carrier with a selected pourable material;
   pressing a first control button, and thereby causing a transition into a "net" mode, and displaying a base value on the display;
   unloading the carrier at least partially;

pressing the first button a second time, and thereby causing the value of any difference in weight from the first press to be saved to a storage medium, and causing the display to display a value representing the weight of bulk material in the container at the time the button is pressed the second time.

10. A method as recited in claim 9 further comprising, pressing a second control button, and thereby resetting to zero the weight stored in the scale control.

11. A method as recited in claim 10 further comprising, pressing a third control button, and thereby turning off the power to the scale control.

12. A method as recited in claim 11 further comprising, pressing a fourth button, and thereby displaying the data in a field, other than the weight, in response to the press of the fourth control button.

* * * * *